United States Patent [19]

Grotenhöfer

[11] Patent Number: 5,171,105

[45] Date of Patent: Dec. 15, 1992

[54] PROCESS AND DEVICE FOR LINING TUNNELS AND DUCTS HAVING CIRCULAR AND NON-CIRCULAR CROSS-SECTIONS, ESPECIALLY FOR CANAL AND TUNNEL CONSTRUCTION

[75] Inventor: Heinrich Grotenhöfer, Krefeld, Fed. Rep. of Germany

[73] Assignee: Gebr. Eikhoff Maschinenfabrik u. Eisengiesserei mbH, Bochum, Fed. Rep. of Germany

[21] Appl. No.: 824,833

[22] Filed: Jan. 22, 1992

[30] Foreign Application Priority Data

Feb. 8, 1991 [DE] Fed. Rep. of Germany ....... 4103847

[51] Int. Cl.$^5$ .............................................. E21D 11/14
[52] U.S. Cl. ................................... 405/146; 405/141; 405/150.1
[58] Field of Search ............ 405/150.1, 146, 151, 405/155, 138, 141; 29/237; 138/122, 172, 97

[56] References Cited

U.S. PATENT DOCUMENTS

| | | | |
|---|---|---|---|
| 2,996,085 | 8/1961 | Matheny | 405/150.1 X |
| 3,334,945 | 8/1967 | Bartlett | 405/144 X |
| 3,508,317 | 4/1970 | Hill et al. | 405/150.1 |
| 3,603,100 | 9/1971 | Cowley | 405/150.1 X |
| 3,830,545 | 8/1974 | Sugden | 405/144 X |
| 3,972,200 | 8/1976 | Scarpi | 405/150.1 X |

FOREIGN PATENT DOCUMENTS

| | | |
|---|---|---|
| 0011916 | 4/1983 | European Pat. Off. . |
| 2442357 | 4/1975 | Fed. Rep. of Germany . |
| 8913689 | 11/1989 | Fed. Rep. of Germany . |
| 3838537 | 6/1990 | Fed. Rep. of Germany . |
| 3921920 | 1/1991 | Fed. Rep. of Germany . |

*Primary Examiner*—Dennis L. Taylor
*Attorney, Agent, or Firm*—Robert W. Becker & Associates

[57] ABSTRACT

In a process and a winding device for lining elongated spaces such as tunnels or ducts of circular and non-circular cross-sections, especially for canal and tunnel construction band is employed. Tubes with various diameters and different cross-sections, but mainly with circular and egg-shaped cross-sections, may be created from the band by the winding device.

17 Claims, 2 Drawing Sheets

PROCESS AND DEVICE FOR LINING TUNNELS AND DUCTS HAVING CIRCULAR AND NON-CIRCULAR CROSS-SECTIONS, ESPECIALLY FOR CANAL AND TUNNEL CONSTRUCTION

BACKGROUND OF THE INVENTION

The invention relates to a process and a device for lining elongated spaces such as tunnels and ducts with a winding band, whereby tubes with different diameters and cross-sections, but mainly, with circular and egg-shaped cross-sections can be created by a winding device.

From DE-OS 24 42 357 a device is known in which the walls of a tunnel which is driven by a tunnel riving machine are lined during the tunnel driving process with helical windings of a soft band. This device is essentially able to line circular cross-sections. The individual windings overlap each other in the area of their edges, but they are not fixedly joined together.

In German Utility Model 89 13 689 a process is disclosed in which a wound tube is produced by a joining operation in which in the area of their edges the windings are fixedly joined via pressure rollers, so-called cylinders. Here, the strip forming the wound tube is pressed by these cylinders against a cylindrical sleeve whose inside diameter corresponds roughly to the outside diameter of the tube which is being formed. The disadvantage of this device is that the annular space which is produced has to be filled later on and only a circular tube with a constant diameter may be produced.

The same disadvantages also apply to a device in accordance with German Offenlegungschrift 38 38 537. Here, it is proposed that an in-situ tube be manufactured by a winding process in the protected area of the shield tail or the trailer of a tunnel-driving machine.

The lining of non-circular cross-sections, especially of egg-shaped cross-sections, for the purpose of, for example, restoring defective lines, is carried out by applying plates or molded parts, when the space (tunnel) is passable for workmen. In the case of impassable spaces, one option is to insert hoses into the space and to press them against the outer wall by applying inner pressure. These processes are not suitable for new layings of tunnels or ducts; here, the lines are laid in the so-called open construction having impairing effects on traffic and the environment.

It is therefore an object of the present invention to provide linings, especially for non-circular cross-sections of varying size, suitable for sealing defective lines and also for the construction of new lines.

SUMMARY OF THE INVENTION

The problem is solved in that initially, in a known manner, a band is fed continuously to a winding device and wound helically into a lining. The feeding of the helically shaped, i.e., supplied along a helical path, is carried out as described in German patent application P 39 21 920.8: The band, through the rotation of a double tube provided with a helical path, in cooperation with a shifting roller and also a counter-roller, is transported forward to a joining point, where it is joined to the previous winding of the band via a pressure roller and pressed against a shield tail seal. The method of the present invention comprises the following steps: Supplying a band for forming the wound lining; winding the band in the form of a helix in a longitudinal direction of the elongated space about a winding cage surrounded by a shield tail; pressing the band against an inner surface of the shield tail with a pressing roller that is connected to the winding cage; and subsequently pressing the band with readjusting calibrating rollers against the inner surface of the wall means and thereby forming the wound lining in the form of a wound tube. Expediently, elastic elements and movable supports for pressing the pressing roller against the inner surface of the shield tail are provided. Furthermore, elastic elements and movable supports for pressing the calibrating roller against the inner surface of the wall means are provided. It is preferable to provide a rotatable supply reel for the band outside the elongated spaces. A rotatable guide means for guiding lines and media that are supplied by the lines through the helix formed by the band are preferably also provided.

The device for forming a wound lining for elongated spaces according to the present invention is comprised of: a drive unit having a housing; an advancing and bracing unit attached to a first end of the drive; a shield tail connected to the housing at an end opposite the advancing and bracing unit; a winding cage connected within the shield tail to the drive unit; a driving roller for feeding the band, whereby the driving roller is fastened to the winding cage and drivingly connected to the drive unit; a pressing roller connected to the winding cage; and calibrating rollers connected to the winding cage, whereby the pressing roller presses the band against an inner surface of the shield tail and whereby the calibrating rollers subsequently press the band against the inner surface of the wall means to form a wound lining in the form of a wound tube corresponding to the varying cross-sections of the elongated spaces. It is expedient to provide movable supports having a respective elastic element for connecting the pressing roller to the winding cage. Also, the calibrating rollers are preferably provided with movable supports having a respective elastic element for connecting the calibrating rollers to the winding cage.

In another embodiment, the device further comprises means for providing a controlled pressure build-up for pressing the band against the inner surface of the shield tail and the inner surface of the wall means. It is also possible that the device further comprises means for providing a controlled path for pressing the band against the inner surface of the shield tail and the inner surface of the wall means.

Preferably, the drive unit comprises a first and a second driving motor, whereby the first driving motor drives the winding cage and the second driving motor drives the driving roller. Expediently, the drive unit further comprises a toothed wheel for connecting the second driving motor with the driving roller.

In a preferred embodiment, the inventive device further comprises a feed duct connected to the winding cage. The feed duct has rollers arranged in an interior thereof, with axes of the rollers being arranged transverse to the band, and with interior walls of the feed duct having smooth surfaces.

Preferably, the inventive device also comprises guide elements connected to the winding cage, the guide elements being radially adjustable and arranged between the driving roller and the pressing roller.

It is especially preferred that the device according to the present invention, comprises a plurality of winding cages and a plurality of advancing and bracing units. The winding cages and the advancing and bracing units are respectively interchangeably mountable to the drive unit, so that adjustments to varying cross-sections are possible. Preferably, the advancing and bracing unit, the drive unit, and the winding cage have dimensions that allow a lowering thereof through entry shafts of the elongated shapes and mounting on bottom portions of the wall means of the elongated spaces. Means for supporting the advancing and bracing unit at the inner surface of the wall means are advantageously provided.

The shield tail, according to the present invention, is no longer only of a circular cross-section, but may be shaped according to the cross-sections which are to be lined. Accordingly, the pressing roller no longer moves on a circular path, but follows the cross-sectional shape of the shield tail. This is made possible by mounting the pressure roller on movable supports, so that they can be adjusted inwardly or outwardly according to the cross-sectional variations.

After exiting from the shield tail, the wound tube representing the lining is expanded to the final shape by the action of calibrating rollers which are likewise mounted on movable supports. With the inventive method and device, various tunnels and ducts may be lined by suitably positioning the calibrating rollers, whereby the difference in position refers not only to the diameter but also to the cross-sectional shape so that the lining of an egg-shaped cross-section of varying size may be achieved according to the present invention. Of course, it is also possible to apply the present invention to a defined annular space. The following of the pressure rollers and the calibrating rollers may be achieved by providing elastic elements, such as springs which exert a certain pressure, or by a controlled pressure build-up, or by a controlled path.

The winding of different diameters and cross-sectional shapes also requires a varying feeding speed of the band. Accordingly, a drive which is independent of the winding cage is provided for the band. Such a device may be designed as disclosed in European Patent 00 11 916 (FIG. 15). However, this particular design has the disadvantage that the drive is mounted on the revolving winding cage, which is particularly disadvantageous with respect to the energy supply and the control system. A simplification is possible by driving the feed roller via a rotating toothed wheel in the form of a superimposed gear means.

A further advantage of the inventive solution for feeding the spiral-shaped band to the driving rollers lies in the fact that feeding takes place in a feed duct the interior of which is provided with rollers whose axes are transverse to the band. The feed duct is provided with inner wall surfaces having smooth walls. The rollers reduce friction during the feeding of the band and the closed arrangement of the walls is intended to facilitate the threading of the band.

A further embodiment, with regard to the threading operation, provides lateral guide elements, which are arranged in the area between feeding roller and pressuring roller, with the band being joined at the pressure roller. During the threading operation, these guide elements fix the band laterally on its path until it has reached the pressure roller. In the course of the further winding operation, a tube is continuously created from the band, whereby the tube is moved in rotation along the still stationary winding cage. In order to prevent these lateral guide elements from hindering the tube in its rearward movement during threading, they are pressed radially inwardly against a certain spring force by the beginning of the band which forms the wound tube.

A winding device which may be used for repairing leaky ducts may be comprised of the following structural components: Advancing and bracing unit, drive unit, and winding cage. These components are essentially known from German Utility Model 89 13 680. However, since for predetermined structural lengths of the winding cage the band imposes limits on a desired variation in diameter, it is proposed with the present invention that the range of adaptation to different diameters and different cross-sections is extended by simply providing interchangeable winding cages. Of course, it is also possible to provide interchangeable advancing and bracing units. However, the expensive drive unit remains unaltered.

It is furthermore proposed that the length of the structural components be selected such that the components may be lowered through conventional entry shafts and be mounted on the floor of the shaft or tunnel/duct.

As mentioned before, the band is supplied in the form of a helix. Accordingly, the storage reel or spool which is located outside the entry shaft or tunnel is provided with a twisting device, which, through the sequential movements of withdrawing the band from the spool and rotating the spool, creates the helical arrangement of the band required for forming the wound tube.

In German Patent Application No. 39 21 920.8 a rotary guide member for guiding supply and evacuation lines through the helix formed by the band is proposed for a winding device of a tunnel-driving machine. This rotary guide element, during the restoration of lines, may also be provided in a similar form for guiding through material or media which are supplied by these lines, e.g., effluent.

The winding device furthermore has a support for the advancing and bracing device, which is necessary when the advancing portion is moved forward while the bracing portion is not expanded

BRIEF DESCRIPTION OF THE DRAWINGS

A winding device for restoring ducts is illustrated in the following Figures as an exemplified embodiment.

DESCRIPTION OF PREFERRED EMBODIMENTS

Figure 1:
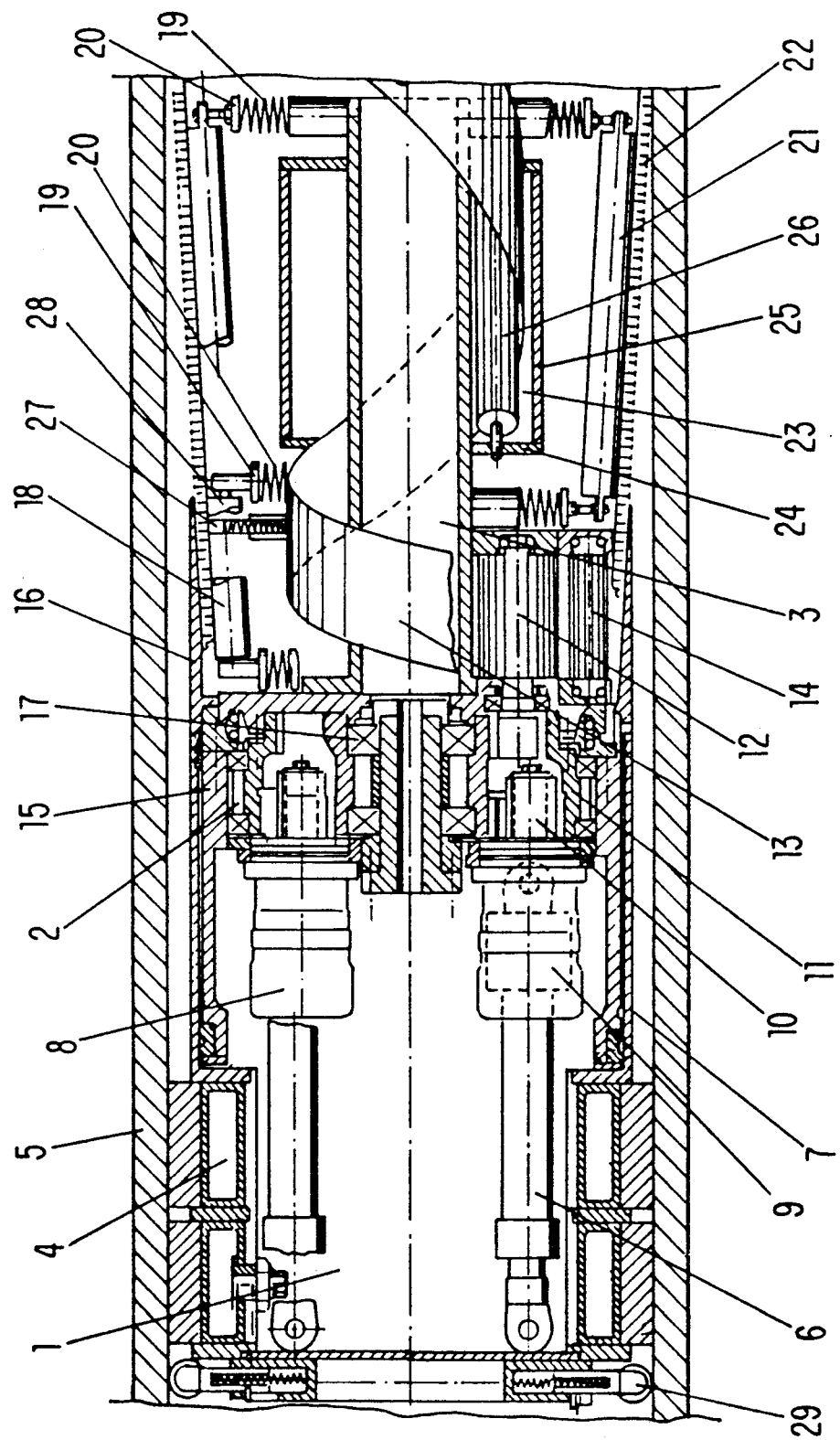
FIG. 1 shows a longitudinal cross-section.

The winding device in FIG. 1 is comprised of the following components: Advancing and bracing unit 1, drive unit 2 and winding cage 3. Reference numeral 4 indicates bracing elements which are expanded by hydraulic or pneumatic actuation in order to brace and support the tunnel or duct 5 which is being restored. The hydraulic cylinders 6 provide the required forward drive, and a telescopic guide member 7 provides guidance. The drive unit 2 is comprised of a driving motor 8 for the winding cage 3 and a driving motor 9 for driving the driving roller 12 of the band 13 via a pinion 10 and a revolving toothed wheel 11. A counter roller 14 is arranged opposite the driving roller 12. The shield tail 16 forms an extension of the drive housing 15.

The winding cage 3 has a bearing means 17, via which it is fastened to the drive 2. The pressing roller 18 is mounted on movable supports 19 and is pressed on by springs 20. The calibrating rollers 21, due to their slanted arrangement relative to the axis of the duct 5 and their readjustment via movable supports 19 having elastic elements (springs) 20 (supports 19 and elastic elements 20 from a follower mechanism), enlarge the wound tube 22 (produced from the band 13) by pressing the wound tube 13 against the duct 5 which is being restored. The feed duct 23 which guides the band 13 is comprised of side walls 24, the radially outwardly oriented wall 25 and the guide rollers 26. The lateral guide elements 27 between pressing roller 18 and driving roller 12 are pressed radially outwardly via spring elements 28. The advancing and bracing unit 1 has supporting means 29.

Figure 2:
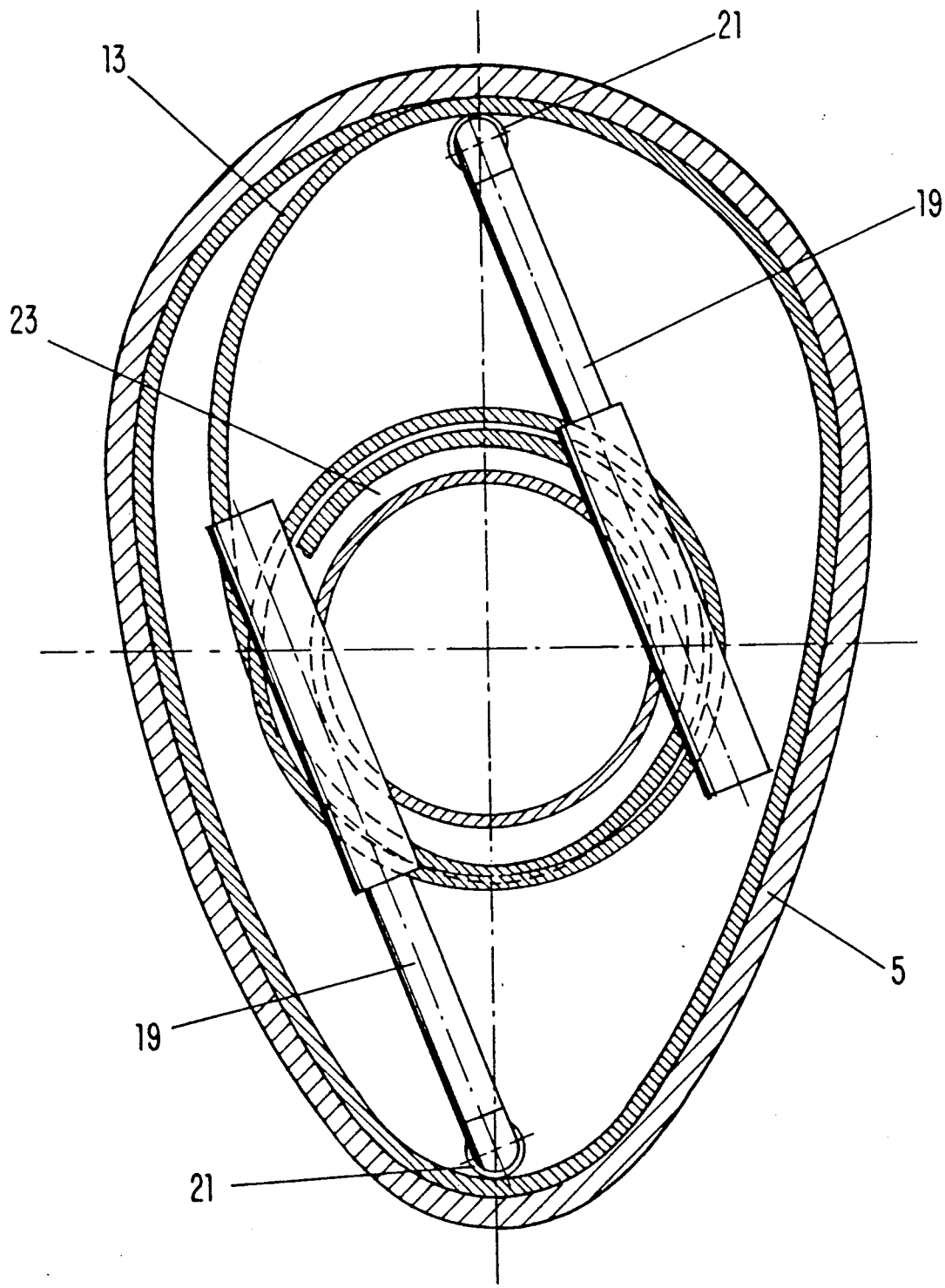
FIG. 2 shows a view from the rear.

FIG. 2 illustrates a design in which the duct or tunnel 5 to be restored is comprised of a concrete tube with an egg-shaped cross-section 30. The band 13 is pressed closely against the wall of the duct 5 by two calibrating rollers 21 with corresponding movable supports 19. The band 13 which is contained in the feed duct 23 is supplied such that it forms a helix.

The present invention is, of course, in no way restricted to the specific disclosure of the specification and drawings, but also encompasses any modifications within the scope of the appended claims.

WHAT I CLAIM IS:

1. A method for forming a wound lining for elongated spaces of varying cross-sections, said elongated spaces being enclosed by respective wall means with an inner surface defining said elongated spaces, said process comprising the steps of:
   supplying a band for forming said wound lining;
   winding said band in the form of a helix in a longitudinal direction of said elongated space about a winding cage surrounded by a shield tail;
   pressing said band against an inner surface of said shield tail with a pressing roller that is connected to said winding cage; and
   subsequently pressing said band with readjusting calibrating rollers against the inner surface of the wall means and thereby forming said wound lining in the form of a wound tube.

2. A method according to claim 1, further comprising the step of providing elastic elements and movable supports for pressing said pressing roller against the inner surface of said shield tail.

3. A method according to claim 1, further comprising the step of providing elastic elements and movable supports for pressing said calibrating roller against the inner surface of said wall means.

4. A method according to claim 1, further comprising the step of providing a rotatable supply reel for said band outside said elongated spaces.

5. A method according to claim 1, further comprising the step of providing a rotatable guide means for guiding lines and media that are supplied by the lines through the helix formed by said band.

6. A device for forming a wound lining for elongated spaces of varying cross-sections from a band, said elongated spaces being enclosed by respective wall means with an inner surface defining said elongated spaces, said device comprising:
   a drive unit having a housing;
   an advancing and bracing unit attached to a first end of said drive;
   a shield tail connected to said housing at an end opposite said advancing and bracing unit;
   a winding cage connected within said shield tail to said drive unit;
   a driving roller for feeding the band, said driving roller fastened to said winding cage and drivingly connected to said drive unit;
   a pressing roller connected to said winding cage; and
   calibrating rollers connected to said winding cage, with said pressing roller pressing the band against an inner surface of said shield tail and with said calibrating rollers subsequently pressing the band against the inner surface of the wall means to form a wound lining in the form of a wound tube corresponding to the varying cross-sections of said elongated spaces.

7. A device according to claim 6, further comprising movable supports having a respective elastic element, said movable supports connecting said pressing roller to said winding cage.

8. A device according to claim 6, further comprising movable supports having a respective elastic element, said movable supports connecting said calibrating rollers to said winding cage.

9. A device according to claim 6, further comprising means for providing a controlled pressure build-up for pressing the band against the inner surface of said shield tail and the inner surface of the wall means.

10. A device according to claim 6, further comprising means for providing a controlled path for pressing the band against the inner surface of said shield tail and the inner surface of the wall means.

11. A device according to claim 6, wherein said drive unit comprises a first and a second driving motor, said first driving motor driving said winding cage and said second driving motor driving said driving roller.

12. A device according to claim 11, wherein said drive unit further comprises a toothed wheel connecting said second driving motor with said driving roller.

13. A device according to claim 6, further comprising a feed duct connected to said winding cage, said feed duct having rollers arranged in an interior thereof, with axes of said rollers being arranged transverse to the band, and with interior walls of said feed duct having smooth surfaces 14. A device according to claim 6, further comprising guide elements connected to said winding cage, said guide elements being radially adjustable and arranged between said driving roller and said pressing roller.

15. A device according to claim 6, wherein a plurality of said winding cages and a plurality of said advancing and bracing units are provided, said winding cages and said advancing and bracing units respectively being interchangeably mountable to said drive unit, so that adjustments to varying cross-sections are possible.

16. A device according to claim 6, wherein said advancing and bracing unit, said drive unit, and said winding cage have dimensions that allow a lowering thereof through entry shafts of said elongated shapes and mounting on bottom portions of the wall means of said elongated spaces.

17. A device according to claim 6, further comprising means for supporting said advancing and bracing unit at the inner surface of the wall means.

* * * * *